Figure 1:
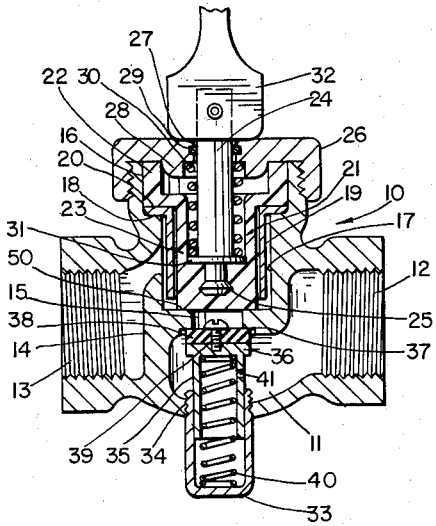

June 18, 1963  J. A. CHERNAK ETAL  3,094,145
SELF-CLOSING STOP VALVE
Filed June 16, 1959

INVENTORS.
JOHN CHERNAK
BY   ELROY J. GIESE

ATTORNEYS

United States Patent Office 3,094,145
Patented June 18, 1963

3,094,145
SELF-CLOSING STOP VALVE
John A. Chernak, Euclid, and Elroy J. Giese, Cleveland, Ohio, assignors to Tomlinson Industries, Inc., Cleveland, Ohio, a corporation of Ohio
Filed June 16, 1959, Ser. No. 820,726
6 Claims. (Cl. 137—614.2)

This invention relates to self-closing stop valves and finds particularly useful application as a water inlet valve for use on coffee urns of the type utilized in restaurants, cafeterias and the like.

In urns of this type, it is common practice to employ a feed line for conducting water to the coffee urn. The feed line may be connected to a source of water supply and by this means the coffee urn may be filled with water for subsequent mixing with coffee. Another valve may be employed for tapping off the coffee after a completion of the brewing process.

Generally speaking, line pressures in these water feed lines are susceptible to a substantial amount of variation, depending upon the characteristics of the water source. Sometimes these pressures may reach a magnitude in the neighborhood of 100 p.s.i. It is, therefore, necessary that water inlet valves employed in these water feed lines be capable of efficient and dependable operation when subjected to high range pressures.

An added consideration which must be dealt with stems from the fact that most water inlet valves in present commercial use employ a sealing gasket of one type or another which, in co-operation with the seat, acts to start and stop the flow of water through the valve. Bearing in mind the limitations of the more frequently used gasketing materials, it will become immediately obvious that over extended period of use, the gaskets will eventually wear out and therefore require replacement. Prior to this time the replacement of these worn out gaskets involved a highly impractical and inconvenient process since it was necessary to drain the coffee urn before proceeding with the replacement. This situation was far from desirable in that it was time consuming and extremely messy in that water and coffee were generally spilled on and around the urns during the draining process.

By means of our invention we have completely eliminated the necessity of such draining operation and have provided means by which the replacement of the gasket, when necessary, involves a simple operation requiring only a minimum amount of time.

One object of this invention is to provide a valve particularly useful in water feed lines for reservoirs.

Another object of this invention is to provide a valve provided with auxiliary self-closing means to facilitate the replacement of the primary sealing means.

A further object of this invention is to provide a water inlet valve especially for coffee urns and in which the primary sealing means of the valve may be replaced without draining the urn.

Still another object of this invention is to provide a valve which is capable of dependable and efficient operation within the higher pressure ranges by virtue of the provision of guide and retaining means for the primary sealing means thereof to prevent the sealing means from being forced out of sealing contact with the valve seat.

A still further object of this invention is to provide a self-closing valve in which an auxiliary piston or screw type sealing member is provided in order to allow efficient replacement of the primary sealing means of the valve.

Other objects and advantages will be apparent from the detailed description to follow.

Figure 2:
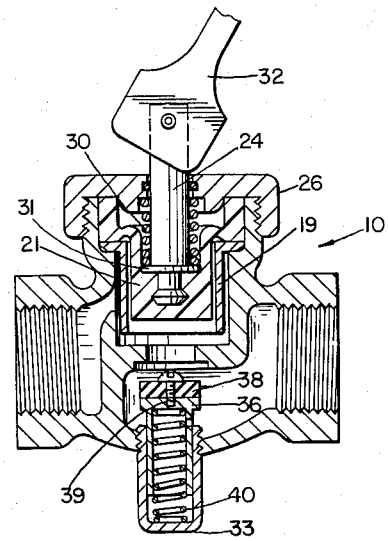
Figure 3:
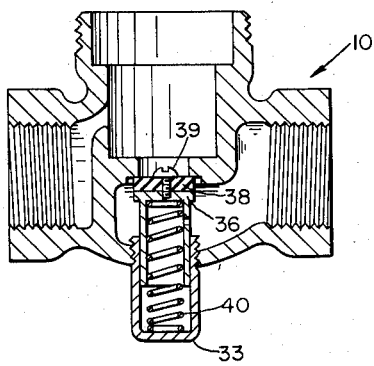
Figure 4:
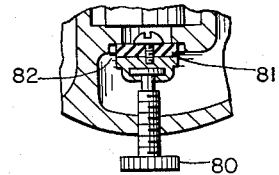

Referring now to the drawings:

FIG. 1 is a view partly in longitudinal section of a self-closing stop valve embodying this invention and with the valve closed;

FIG. 2 is a view partly in longitudinal section of the valve of FIG. 1 in which the valve is open for allowing the flow of fluids therethrough; and FIG. 3 is a view partly in longitudinal section of the valve of FIGS. 1 and 2, in which the primary sealing means and the operating means therefor is removed for replacement of the sealing means and showing the manner in which the auxiliary sealing means closes off the flow of fluids through the valve; and FIG. 4 is a fragmentary view, partly in longitudinal section, of a modified form of the invention.

Referring now more particularly to the drawings, we have illustrated an improved embodiment of my invention as including a housing generally indicated at 10 and being generally T-shaped in section. The housing 10 is provided with a fluid passageway 11 provided at one end thereof with threads 12 for engagement with the inlet pipe (not shown) of a coffee urn or other reservoir and provided at the other end with threads 13 for engagement with the water feed or supply line (not shown). Intermediate the ends of the fluid passageway 11 is a Z-shaped partition 14 having the free ends of the legs thereof integrally attached to the internal walls of the fluid passageway 11. An aperture 15 is provided in central portions of the web of the Z-shaped partition 14 whereby the portions of the fluid passageway 11 on either side of the partition 14 may be in communication with each other, when desired.

A pair of co-axial counterbores 16 and 17 are formed in the housing in general axial alignment with the aperture 15. The counterbore 17 is somewhat smaller in cross-sectional dimension than the counterbore 16 and is joined thereto by a transversely extending shoulder 18. Received within the co-axial counterbores 16 and 17 is a tubular rigid guide sleeve or protective shield member 19. The guide sleeve or protective shield 19 is provided at one end with a transversely extending and outwardly directed flange 20, which is of a size to substantially fit the counterbore 16 and which rests upon the transversely extending shoulder 18.

It will be apparent from an examination of the drawings that there is a substantial clearance provided between the external surface of the guide sleeve 19 and the surface of the counterbore 17, as well as between the inner end of the guide sleeve 19 and the opposed surface of the web of the Z-shaped partition 14. This clearance allows the flow of fluids past the rigid guide sleeve or protective shield 19 when the valve is opened. Received within the co-axially aligned counterbores 16 and 17 is a resilient sealing member or seat cup indicated generally as 21 and which includes a tubular base portion 22 of a size to fit snugly within the counterbore 16. A tubular nipple portion 23 of the sealing member 21, which is of substantially reduced cross-sectional dimension with respect to the base portion 22, extends towards the aperture 15. The portion 50 of the web of the Z-shaped partition 14 surrounding the aperture 15 and forming the bottom of the counterbore 17 acts as a seat against which the end wall of the tubular nipple portion 23 is adapted to sealingly abut.

A reciprocable plunger member co-axial with the sealing member 21 is provided with an end bead or knob-like member 25, which is removably snap-fitted into a recess provided in the end wall of the tubular nipple portion 23. A nut member 26 is removably engaged with the housing 10 and is provided with a central opening 27, in which the plunger 24 is adapted to reciprocate. The nut 26 engages the opposed end of the base portion 22 of the sealing member 21 whereby the nut 26 and the transverse flange 18 on the guide sleeve or protective shield member 19 maintain the base portion 22 of the sealing member 21 against appreciable axial movements with respect to the housing 10.

An axially extending flange 28 provided on the nut 26 maintains the free end of the base portion 22 firmly against the wall of the counterbore 16. The wall of the opening 27 formed in the nut 26 is grooved to receive an O-ring or the like 29, which serves the dual purpose of guiding the plunger 24 and preventing leakage through the plunger opening in the event that the sealing member 21 should develop a leak.

A spring member 30 bears at one end against the nut 26 and at the other end against the transversely extending and outwardly directed flange 31 or the like formed on the plunger 24. This spring means acts to bias the plunger towards the sealing seat 50 surrounding the aperture 15.

A rockable cam member 32 attached to the plunger 24 and bearing against the nut 26 may be operated to cause reciprocation of the plunger. As shown in FIG. 2, as the plunger moves away from the aperture 15 and the surrounding sealing seat 50, the tubular nipple portion 23 of the sealing member is carried with the plunger away from the sealing seat and is partially retracted within the tubular base portion 22. The guide sleeve 19, being substantially rigid, alters the flow path of the incoming fluid and thereby prevents the tubular nipple portion 23 of the sealing means 21 from being forced laterally under the influence of high pressures. It will be obvious, of course, that such a lateral movement or skewing could result in the end wall of the tubular nipple portion 23 being forced away from the aperture 15 by incoming fluid, whereby leakage through the valve would result.

Generally aligned wtih the aperture 15, but on the other side of the web of the Z-shaped partition 14, we provide a hollow cap member 33 removably attached to the housing as by thread means 34. Received within the cap 33 and reciprocable with respect thereto is a hollow piston 35. The piston 35 is provided with an end wall 36, generally opposed to the aperture 15 and to a second sealing seat 37 surrounding the same. An auxiliary sealing member 38 is attached to the end wall 36 of the piston 35 as by means of screw member 39. A relatively weak spring means 40 resiliently biases the piston and the attached auxiliary sealing means 38 into sealing engagement with the seat 37.

An aperture 41 is provided in the side wall of the piston 35 to allow the escape of fluid contained between the cap 33 and the piston 35 when the piston is moved away from the seat 37. It will be recognized that in the absence of such an aperture or equivalent relief means, the piston 35 would not freely reciprocate within the cap 33.

In operation, when the cam member 32 is rocked, as shown in FIG. 2, the reciprocable plunger 24 is moved away from the aperture 15, thereby carrying with it the tubular nipple portion 23. This allows fluid to pass through the aperture 15 and exert a pressure on the auxiliary sealing means 38. Since the spring means 40 which biases the piston 35 and the attached sealing means 38 into engagement with the sealing seat 37 is relatively weak and the pressure of the fluid passing through the aperture 15 is relatively high, the biasing strength of the spring will be overcome and the piston 35 will be moved away from the sealing seat 37 to thereby allow fluids to pass completely through the valve. When the cam means 32 is operated to return the end wall of the tubular nipple portion 23 into sealing engagement around the aperture 15, the flow of fluid will be cut off and the piston 35, being no longer under the influence of line pressures, will return the auxiliary sealing means 38 into sealing engagement with the seat 37.

In the event that replacement of the sealing means 21 is required, the nut 26 is removed and the piston 24, along with the sealing member 21 and the guide sleeve 19, if so desired, is removed from the valve. This operation has no effect whatsoever on the piston 35, which continues to force the auxiliary sealing means 38 into sealing engagement with the seat 37. For this reason any liquid contained in the coffee urn or other reservoir to which the valve is attached by means of threads 12 will be prevented from passing through the aperture 15. It is therefore apparent that there is no need to drain the coffee urn or the reservoir before proceeding to replace the sealing means 21. It will, of course, be understood that a valve (not shown) would be provided in the water feed line upstream of the water inlet valve, and that this valve would be operated to shut off flow in the line before the sealing member 21 could be removed from the housing 10.

In FIG. 4 we have shown a modified form of the invention in which a thumb screw 80 or the like may be employed to move the auxiliary seal 81 toward and away from its associated seat 82. It will be realized that in this form of the invention, the auxiliary seal 81 will normally be disposed in a position away from the seat 82. At times when replacement of the primary seal is required, the auxiliary seal will be moved manually into sealing association with the seat 82 by means of the thumb screw 80, as shown in FIG. 3.

The manually operated auxiliary seal illustrated in FIG. 4 offers an additional advantage in that it may be used as a pressure regulating means. It is in most cases undesirable to conduct liquid under extremely high pressures directly to the urn or other reservoirs with which the valve is associated.

Therefore, when pressure in the supply line is high, the thumb screw may be operated to reduce the clearance between the auxiliary seal and its associated seat. In this way, the full force of the fluid in the line is prevented from exerting itself directly upon the urn.

Conversely, when line pressure is very low, the clearance between the auxiliary seal and its seat may be increased in order to obtain optimum results.

It can now be seen that this invention provides a valve which excels in convenience of maintenance and which is efficient and dependable in performing under the influence of higher range pressures.

The invention has been illustrated as being embodied in only a few approved forms for the purpose of simplicity of description. It will be immediately obvious to one possessing but ordinary skill in the art, however, that there are numerous alterations which could be made to the structure of the illustrated embodiments without departing from the spirit and scope of the true invention. It is therefore our desire to be limited only by the spirit and scope of the appended claims.

We claim:

1. In a valve, a body having a passageway therethrough, an inlet adjacent one end of said passageway, an outlet adjacent the other end of said passageway, a partition in said passageway between said inlet and outlet, said partition having an opening therethrough, first and second seats respectively on the inlet and outlet sides of said partition and surrounding said opening, an elongated resilient primary sealing element disposed in said passageway on the inlet side of said partition, one end of said primary sealing element being fixed with respect to said body, means to move the opposite end of said primary sealing element into and out of sealing engagement with said first seat, the passageway being so constructed and arranged that the path of flow from said inlet to said opening in the partition is directed at said sealing element at an abrupt angle to the axis of elongation of said sealing element, rigid elongated protective shield means in said passageway between said primary sealing element and said inlet constructed and arranged to shield said primary sealing element from impinging flow by diverting said flow to a direction axially of said sealing element and toward said opening in the partition, an auxiliary sealing element disposed in said passageway on the outlet side of said partition, and means to move said auxiliary sealing element into and out of sealing engagement with said second seat.

2. A valve of the character indicated in claim 1, wherein said means to move said auxiliary sealing element includes stem means interconnected with said auxiliary sealing element and threadedly associated with said body.

3. A valve of the character indicated in claim 1, wherein said means to move said auxiliary sealing element includes resilient means biasing said element into sealing engagement with said second seat.

4. In a valve, a body having a passageway therethrough, an inlet adjacent one end of said passageway, an outlet adjacent the other end of said passageway, a partition in said passageway between said inlet and outlet, said partition having an opening therethrough, first and second seats respectively on the inlet and outlet sides of said partition and surrounding said opening, a resilient primary sealing element having a tubular base fixed with respect to said body and a coaxial nipple extending from said base into said passageway on the inlet side of said partition in substantially axial alignment with said opening in the partition, means to move said nipple into and out of sealing engagement with said first seat, the passageway being so constructed and arranged that the path of flow from said inlet to said opening in said partition is directed at said nipple at an abrupt angle to the axis of said nipple, a rigid elongated protective shield in said passageway between said primary sealing element and said inlet constructed and arranged to shield said nipple from impinging flow by diverting said flow to a direction axially of said nipple and toward said opening in the partition, means supporting said primary sealing element and said means to move said nipple for outward removal from said body as a unit for replacement of the primary sealing element, an auxiliary sealing element disposed in said passageway on the outlet side of said partition, and means to move said auxiliary sealing element into and out of sealing engagement with said second seat.

5. A valve of the character indicated in claim 4, wherein said means to move said auxiliary sealing element includes stem means interconnected with said auxiliary sealing element and threadedly associated with said body.

6. A valve of the character indicated in claim 4, wherein said means to move said nipple and the means supporting the latter means, have additional seal means interposed therebetween to prevent leakage.

References Cited in the file of this patent

UNITED STATES PATENTS

| | | |
|---|---|---|
| 2,005,445 | Wiedhofft | June 18, 1935 |
| 2,087,037 | McCarthy | July 13, 1937 |
| 2,089,977 | Marchant | Aug. 17, 1937 |
| 2,118,300 | Ford | May 24, 1938 |
| 2,225,838 | Miller | Dec. 24, 1940 |
| 2,506,837 | Kochner | May 9, 1950 |